Oct. 6, 1970  N. HYLTÉN-CAVALLIUS ET AL  3,532,901
THYRISTOR CONVERTER
Filed June 12, 1967
Fig.1
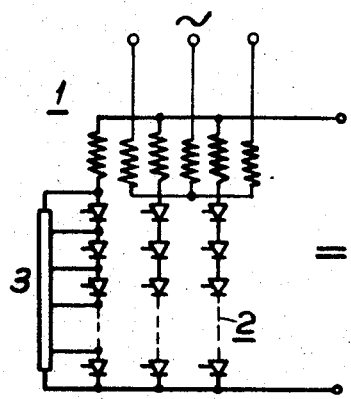
Fig.1a
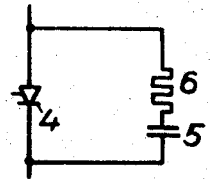
Fig.2        Fig.2a        Fig.3        Fig.4
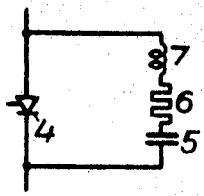 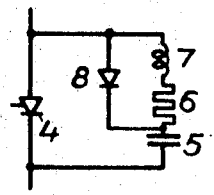 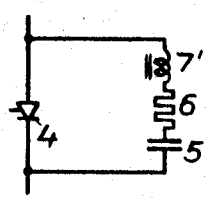 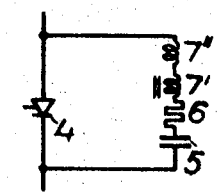
Fig.5
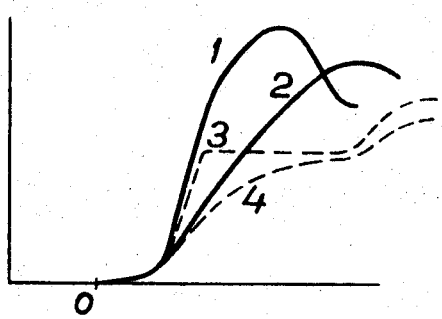
INVENTOR.
NILS HYLTÉN-CAVALLIUS
CARL INGVAR BOKSTÖ
ARNE ÅLGBRANT
KARL ERIK OLSSON
BY
Bailey, Stephens & Huettig United States Patent Office 3,532,901
Patented Oct. 6, 1970

3,532,901
THYRISTOR CONVERTER
Nils Hyltén-Cavallius, Carl Ingvar Boksjö, and Karl-Erik Olsson, Ludvika, and Arne Älgbrant, Vastervik, Sweden, assignors to Allmanna Svenska Elektriska Aktiebolaget, Vasteras, Sweden, a corporation of Sweden
Filed June 12, 1967, Ser. No. 645,105
Claims priority, application Sweden, June 10, 1966, 7,936/66
Int. Cl. H03k 17/00
U.S. Cl. 307—252                                             3 Claims

ABSTRACT OF THE DISCLOSURE

A static converter is provided with thyristor-rectifiers, that is rectifiers comprising series-connected thyristors, which rectifiers are parallel-connected with resistive, capacitive voltage dividers.

Further, said voltage dividers comprise series-connected inductive elements with non-linear inductance.

BACKGROUND OF THE INVENTION

Field of the invention

The present invention relates to a high voltage converter having so-called thyristor-rectifiers or thyristor piles, that is, each rectifier of the converter consists of a number of series-connected thyristors, each rectifier being parallel-connected with a voltage divider formed of resistive and capacitative elements.

The prior art

The purpose of such a voltage divider is to maintain a certain desired voltage distribution along the thyristor-rectifier both during the blocking and reverse blocking intervals of the rectifier and during ignition and extinction so that no thyristor is influenced by dangerous over-voltages. In the capacitive parts of such a voltage divider, during the reverse blocking interval of a rectifier a certain amount of electric energy will be generated which, when the thyristors ignite, is discharged through them. The current increase at discharge is determined, among other things, by the dimensioning of the voltage divider elements. In considering this dimensioning it should be observed that when a thyristor ignites, its depletion layer will at first become conducting pointwise, or at least within limited areas, so that the thyristor current will only later spread over the entire thyristor. In order to avoid great current densities within said first igniting areas, therefore, the positive derivative of the thyristor current should be limited so that it does not increase so rapidly that the thyristor is completely over-loaded.

It might appear convenient to limit the thyristor current with the help of reactors in series with the thyristors, but such a solution has several disadvantages. Such reactors must be dimensioned for the main current of the converter and will therefore be large and cumbersome. Also the permitted reactance of the reactors will be considerably limited if the commutation time for the rectifiers is to be kept within reasonable limits and furthermore, when the thyristor-rectifiers are short-circuited with the help of by-pass connections, the reactor inductance will maintain the thyristor current and it is therefore impossible to obtain an instantaneous by-pass connection of the thyristor-rectifier.

SUMMARY OF THE INVENTION

According to the present invention it is suggested that instead of, or complementary to, reactors in the main circuit inductive elements be arranged in the voltage dividers in series with their capacitive parts, which inductive elements are arranged in parallel with at least some of the thyristors in a pile. Thus, it is often possible to arrange the ignition times for the various thyristors within a pile so that the strains on the various thyristors are distributed as desired and it is mainly the last-igniting thyristors which are most subjected to strain. It is therefore just in these thyristors that it must be possible to control the current increase during ignition.

Suitably the inductive elements are made with non-linear inductance in order to avoid unnecessarily large current limitations within the voltage divider or between the voltage divider and corresponding thyristors.

BRIEF DESCRIPTION OF THE DRAWINGS

The invention will be further described with reference to the accompanying drawings where FIGS. 1 and 1a show a conventional converter with thyristor-rectifiers, while FIGS. 2–4 show different embodiments according to the invention. FIG. 5 shows current curves of the increasing thyristor current in the difference cases.

DESCRIPTION OF THE PREFERRED EMBODIMENTS

FIG. 1 shows a converter comprising a converter-transformer 1 and thyristor-rectifiers 2 connected to it. Each thyristor-rectifier is parallel-connected with a voltage divider 3 formed of capacitive and resistive elements and having traverse-connections connected to outputs between the different thyristors. FIG. 1a shows how one of the thyristors 4 in one of the thyristor piles 2 in FIG. 1 is parallel-connected to the corresponding part of the voltage divider 3 comprising a capacitive element in the form of a capacitor 5 and a resistive element in the form of a resistor 6. During the blocking interval of the thyristor-rectifier in question, is the time when a positive voltage grows up over the thyristor-rectifier up to the ignition point for this rectifier, a charging current will flow through the voltage divider and the capacitive elements 5 will be charged.

When the thyristor 4 has received an ignition pulse, a current starts to flow through the thyristor. The charging current to the capacitor 5 will successively decrease and also alter direction. When this happens the current through the thyristor may be considered as being composed of the network current and the discharge current from the voltage divider. The thyristor current will have a course approximately as indicated by curve 1 in FIG. 5, where the time is indicated as abscissae, whereas the ordinates indicate the current. The point 0 indicates the ignition point for the thyristor. Since the inductance in the circuit shown in FIG. 1 is very low the current will increase very rapidly and there is therefore risk that the current density in the thyristor may reach dangerous values. In order to limit the current derivative in the thyristor current, in FIG. 2 an inductive element has been inserted in the form of a reactor 7. This element will endeavour to maintain the current through the voltage divider at the value it had at ignition of the thyristor 4, which means that the current through the thyristor will increase more slowly than it would have done without this reactor. In this way a certain limitation of the maximum value of the current is also obtained. The course is shown by curve 2 in FIG. 5.

However, there is a limit to the size of the reactor 7, since this not only limits the discharge current in the circuit in FIG. 2 but also limits the charging current for the capacitors 5 arising in the voltage divider. Thus, if a high inductance is chosen for the reactor 7, the impedance of the voltage divider will be so high that the last-igniting thyristors may be subjected to dangerous over-voltages.

To avoid this disadvantage, it is proposed to parallel-connect at least part of the reactor 7 with a diode having the same conducting direction as that of the thyristor pile. In FIG. 2a this has been indicated by a diode 8 which is parallel-connected both with the reactor 7 and the resistor 6. In this way the elements 6 and 7 do not influence the voltage during the blocking interval or during ignition of the first thyristors and the voltage will, therefore, remain low even over the last-igniting thyristors. After ignition, when the voltage divider current is reversed, the discharge current will flow through the elements 6 and 7 and is strongly influenced by these elements, thus giving a reduction in thyristor current. The current curve will be substantially similar to the curve 2 in FIG. 5, but since there is a wider choice as to the size of 7 and 6, these can be made larger than according to FIG. 2, thus limiting both the derivative and the maximum value of the current. The insertion of the diode 8 gives a certain non-linear characteristic in the reactor 7. Another way of effecting such a non-linear characteristic in the reactor 7 is shown in FIG. 3 where the inductive element consists of a reactor 7' having a saturatable iron core. During the blocking interval of the thyristor 4 the charging current for the capacitor will saturate this iron core and the inductance of the reactor will thus be small. When the thyristor 4 is ignited and the current through the voltage divider circuit has not yet had time to reverse, the iron core is still saturated. It will thus have no influence on the current through the voltage divider and the current through the thyristor will increase according to curve 1 in FIG. 5. At the moment when the current reverses, however, the reactor will assume a considerable reactance which strongly limits continued current increase until the iron core has become saturated with current of opposite polarity. The resultant current course corresponds to the curve 3 in FIG. 5.

The connection in FIG. 3 can be further modified either by making the saturatable reactor core with an air gap or by dividing the reactor into two parts, namely a part 7' with saturatable core and a part 7" designed as a pure air reactor as indicated in FIG. 4. In both cases an equalisation of the knee-curve characteristic according to curve 3 in FIG. 5 is obtained and instead a smoother curve shape 4 is obtained where the current derivate is kept permanently at a moderate value.

Thus, according to the invention a strong limitation of the current derivative in the growing thyristor current is obtained, without introducing any current-limiting elements in the main circuits of the converter.

What is claimed is:
1. High voltage converter comprising at least one pile comprising a plurality of series-connected thyristors and a capacitative, resistive voltage divider connected in parallel with said pile and composed of a plurality of parts connected to said pile at points along its length between thyristors, at least some of said parts each comprising an inductive element and a capacitative element in series and a diode connected in parallel with the inductive element, the conductive direction of the diode being the same as that of the thyristor pile.

2. High voltage converter according to claim 1, in which the diode is parallel-connected with the resistive and inductive elements.

3. High voltage converter according to claim 2, in which said inductive elements comprise reactors having saturable cores.

References Cited

UNITED STATES PATENTS 3,386,027   5/1968   Kilgore et al.

OTHER REFERENCES

The Silicon Controlled Rectifier Manual, General Electric, Mar. 23, 1964, pp. 32–39, 92–93, 96–97, 188–189.

DONALD D. FORRER, Primary Examiner

J. D. FREW, Assistant Examiner

U.S. Cl. X.R.

307—202, 284, 305